United States Patent
Steckler

[11] 3,855,364
[45] Dec. 17, 1974

[54] PHOSPHATE ESTERS OF HYDROXYALKYL ACRYLATES AND HYDROXYALKYL METHACRYLATES

[75] Inventor: Robert Steckler, Crofton, Md.
[73] Assignee: Alcolac Inc., Baltimore, Md.
[22] Filed: Jan. 5, 1973
[21] Appl. No.: 321,229

[52] U.S. Cl. ........ 260/952, 117/161 UT, 260/80.71, 260/980
[51] Int. Cl. ............................................. C07f 9/08
[58] Field of Search .................................. 260/952

[56] References Cited
UNITED STATES PATENTS
3,574,794  4/1971  Hargis ............................ 260/952

Primary Examiner—Anton H. Sutto
Attorney, Agent, or Firm—Henry B. Kellog; George L. Tone

[57] ABSTRACT

Polymerizable compositions containing mixtures of primary (monoester) and secondary (diester) phosphate esters of hydroxyalkyl acrylates and hydroxyalkyl methacrylates characterized by the following general formulae:

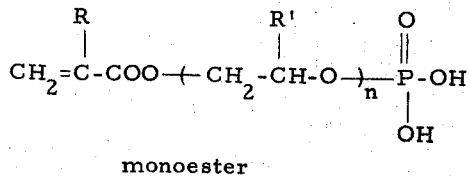

monoester

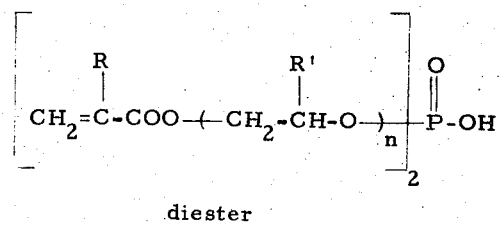

diester wherein R is either hydrogen or methyl group, R' is either hydrogen or alkyl of from 1 to 22 carbon atoms or mixtures thereof and $n$ is a positive integer of from 1 to 3.

7 Claims, No Drawings

PHOSPHATE ESTERS OF HYDROXYALKYL ACRYLATES AND HYDROXYALKYL METHACRYLATES

This invention is concerned with mixtures consisting essentially of mono- and di-phosphate esters of hydroxyalkyl acrylates and hydroxyalkyl methacrylates which are useful as polymerizable monomers and as intermediates in organic synthesis. It is known that methyl acrylate and methyl methacrylate react at temperatures between 15°–40°C. with diallyl phosphite in the presence of sodium allylate as catalyst and hydroquinone as polymerization inhibitors to yield, following vacuum stripping of the reaction mixture and distillation, diallyl phosphonate esters; i.e., diallyl, beta-carboxymethyl ethanephosphonate and diallyl, beta-carboxymethyl propanephosphonate, respectively. The latter diallyl phosphonate esters are capable of polymerization to solid resins because of the presence of the two (2) diallyloxy radicals directly attached to the pentavalent phosphorous atom in the monomer chain. In view of their structural configuration, they may be considered as triesters.

Trimethallyl phosphate, a triester containing an alpha ethylenic unsaturation, is also known. It is prepared by the reaction of methallyl alcohol or a sodium salt thereof with phosphorous oxychloride. Instead of phosphorous oxychloride, ethyl phosphoric acid dichloride or diphenyl phosphoric acid monochloride may be used to give dimethallyl ethyl phosphate and mono-methallyl di-phenyl phosphate, respectively, all of which are triesters. In general, a mixture of phosphate esters is obtained; i.e., mono-, di- and tri-esters.

It is also known that a non-polymerizable triester, such as dimethyl-1-carbomethoxy-1-propen-2-yl phosphate, can be readily prepared by the reaction of a saturated lower alkyl phosphite, such as trimethyl phosphite, with methyl - alpha - chloro-aceto-acetate at a temperature ranging from room to about 85° C.

From the methods used in preparing the foregoing esters, it is readily apparent that relatively expensive phosphating agents are employed; i.e., diallyl- and trimethyl-phosphite, and ethylphosphoric acid dichloride, which require involved procedures for their preparation, let alone the involved procedures for making the triesters. Where phosphorous oxychloride is used, it is well recognized that with such phosphating agents inconsistent mixtures of different types of esters are generally obtained; i.e., primary, secondary, and tertiary phosphates. Such mixtures are encountered when hydroxylic organic compounds are esterified with phosphorous oxychloride, including phosphorous pentoxide.

It is the principal object of the present invention to provide a new composition of matter containing mixtures of phosphate mono- and di-esters of hydroxyalkyl acrylates and hydroxyalkyl methacrylates having manifold uses in the chemical arts.

Other objects and advantages will become evident from the following description.

I have discovered that the foregoing objects are attained by phosphating about 1–2 moles of hydroxyalkyl acrylate or hydroxyalkyl methacrylate with about one mole of $P_2O_5$ as present in 115 percent polyphosphoric acid at a temperature ranging from 45° to 80° C. in the presence of a small amount of polymerization inhibitor.

By the use of the less expensive 115 percent polyphosphoric acid in a noninvolved method, monophosphate esters are obtained in yields of from 55 to 75 percent with 10 to 25 percent of diester, with from 4 to 20 percent of free phosphoric acid, and from 3 to 6 percent of unreacted hydroxyalkyl acrylate or methacrylate. These percentages are percent by weight based on the total weight of the reactants.

The polyphosphoric acid utilized as the phosphating agent in preparing the novel mixed esters of the present invention is an equilibrium mixture of orthophosphoric, pyro-phosphoric and higher linear phosphoric acids. The polyphosphoric acids commercially available, which are much cheaper than the phosphating agents referred to above, range from 110 to 120 percent $H_3PO_4$ and corresponding to about 80 to 86.5% $P_2O_5$. Superphosphoric acid equivalent to 105% $H_3PO_4$ corresponds to 76% $P_2O_5$. Ordinary phosphoric acid ranges from 75 to 85% $H_3PO_4$ corresponding to 54 and 61.5 percent of $P_2O_5$. For the purpose of the present invention, I prefer to use polyphosphoric acid of 115% $H_3PO_4$ content equivalent to about 83 percent of $P_2O_5$. The use of the latter acid produces a higher monoester content than either $P_2O_5$ alone, or 105 percent superphosphoric acid. The amount of free phosphoric acid remaining after the phosphating reaction is completed may range from about 4 to no more than about 20 percent. This will depend upon the starting ratio of hydroxy compound to 115 percent polyphosphoric acid. An increase to 3 or even 4 moles of hydroxy compound per mole of 115 percent polyphosphoric acid will reduce the amount of residual free phosphoric acid, but the amount of unreacted hydroxy compound will simultaneously be greatly increased and the phosphorous content of the reaction product correspondingly decreased.

Since the phosphated reaction mixture as such may be subjected to homopolymerization or copolymerization with other vinyl monomers to yield a new and useful class of polymers, there is no need to vacuum strip or to fractionally distill it. In short, the phosphated reaction mixture may be used as such in the preparation of homo- and co-polymers, in the preparation of flame-retardant latices and binders for non-woven fabrics, in fibers to impart fire-retardant and anti-static properties and as flame-proofing co-monomers and cross-linking agents in the preparation of polyesters and in diallyl phthalate polymers.

The hydroxyalkyl acrylates and methacrylates utilized in accordance with the present invention are readily prepared in the conventional manner by the addition of 1, 2 or 3 moles of either ethylene oxide, 1,2-propylene oxide or 1,2-butylene oxide to one mole of acrylic acid or methacrylic acid in the usual manner. They may also be prepared by the addition to the acid of 1, 2 or 3 moles, preferably 1 mole, of a 1,2-epoxy alkane; i.e., epoxide of an alphaolefin. The latter are colorless, mobile liquids having a terminal epoxy group on a straight or branched chain. They are described in the chemical literature and are commercially available, being produced by the epoxidation of a straight chain or branched chain (or mixture thereof) alpha-olefin of from 6 to 24 carbon atoms; i.e., from hexene-1 to tetracosene-1, by a peracid directly or by a chlorohydrin and caustic route. The generalized formula for such epoxides is:

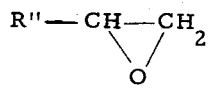

wherein R" is either a straight or branched chain alkyl of from 4 to 22 carbon atoms or mixtures thereof. The epoxides may be derived from cracked wax and therefore, R" may be both even and odd-numbered alkyl carbon chain or a mixture of such alkyl chains. The even-numbered alkyl carbon chain may be derived from raw materials originating from Ziegler (ethylene) synthesis or from fatty sources.

Commercial grades of hydroxy alkyl acrylates and methacrylates are available which contain variable percentages of the grouping

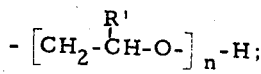

i.e., wherein R' has the same value as above and n is a mixture of 1, 2 and 3 of such groups in the molecular configuration of the hydroxy alkyl acrylate or methacrylate. Normally, such commercial products which are obtained by the usual addition of ethylene oxide, 1,2-propylene or 1,2-butylene oxide to one mole of acrylic or methacrylic acid contain about 92 percent to about 96 percent of product wherein the value of $n$ is 1.0 percent to about 7.5 percent of product wherein the value of n is 2 and from 0 percent to about 1.0 percent of product wherein the value of $n$ is 3. Such commercial grades may also be employed in accordance with the present invention.

The novel mixed esters prepared in accordance with the foregoing procedure are characterized by the following general formulae:

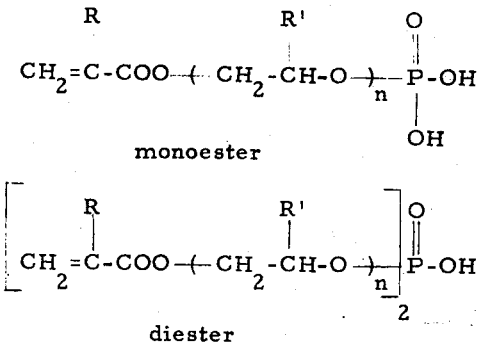

wherein R is either hydrogen or a methyl group, R' is either hydrogen or an alkyl of from 1 to 22 carbon atoms or a mixture of such alkyl groups; i.e., R' can be at least one alkyl group of from 1 to 22 carbon atoms, and n is a positive integer of from 1 to 3.

The following examples are illustrative of the preparation of the mixed esters of the present invention.

EXAMPLE 1

174 grams (1.5 moles) of hydroxyethyl acrylate containing 200 ppm of the monomethyl ether of hydroquinone (MEHQ) as a polymerization inhibitor were charged to a 500 ml. flask. The material was heated while agitating to 40° C. and 170.6 grams of 115 percent polyphosphoric acid (corresponding to 1 mole of $P_2O_5$) were added over a period of two hours. The reaction temperature was controlled to 50–60° C. during the addition with external cooling. The phosphate ester was cooled to 25° C. and discharged.

The product was a pale yellow viscous liquid. Analysis by potentiometric titration of the acidic hydrogens showed the product to be 66 percent monoester, 18 percent diester, 3 percent unreacted hydroxyethyl acrylate, and 13% free phosphoric acid. The bromine number was 77.2.

EXAMPLE 2

162 grams (1.25 moles) of hydroxyethyl methacrylate containing 400 ppm of MEHQ as a polymerization inhibitor were charged to a 500 ml. flask. The material was heated while agitating to 60° C. and 145 grams of 115 percent polyphosphoric acid (corresponding to 0.85 moles of $P_2O_5$) were added from an addition funnel over a period of one hour. The reaction temperature was controlled to 65–75° C. during the addition with external cooling. The phosphate ester was cooled to 25° C. and discharged.

The product is a pale yellow viscous liquid. It forms a clear solution in acetone and a cloudy solution in water. Analysis by potentiometric titration of the acidic hydrogens showed the product to be 60 percent monoester, 19 percent diester, 4 percent unreacted hydroxyethyl methacrylate and 17 percent free phosphoric acid.

The hydrolytic stability of the ester was tested by holding a 4 percent solution in water at 60° C. for 6 hours. Only a 2 percent increase in acidity was observed. The stability toward thermal polymerization was tested by heating 15 grams of the ester to 130° C. No exotherm or other visible sign of polymerization was observed. When cooled, the material had the same solubility and viscosity characteristics as the unheated ester.

EXAMPLE 3

A total of 170.6 grams of 115 percent polyphosphoric acid (corresponding to 1 mole of $P_2O_5$) were added to a 500 ml. flask containing 228.8 grams (1.6 moles) of hydroxy butyl acrylate (obtained by condensing one mole of 1,2-butylene oxide with one mole of acrylic acid) and 300 ppm of MEHQ over a period of two hours. During the addition, the reaction temperature was held at about 75° C. with external cooling. Following the addition, the phosphate ester was cooled to 25° C. and discharged.

The product was a pale yellow viscous liquid. The analytical procedure as in Example 1 showed the product to be 70 percent monoester, 19 percent diester, 3 percent of unreacted hydroxybutyl acrylate and 8 percent of free phosphoric acid.

EXAMPLE 4

364 grams (1.6 moles) of 2-hydroxydecyl-1-acrylate (obtained by the condensation of one mole of 1,2-epoxydecane, $C_{10}$ a-olefin oxide with one mole of acrylic acid) containing 300 ppm of MEHQ as polymerization inhibitor were charged into a one liter flask. The material was heated while agitating to 50° C. and 135 grams of 115 percent polyphosphoric acid (corresponding to 0.8 moles of $P_2O_5$) were added over two hours. The reaction temperature was controlled to 65–75° C. during the addition with external cooling. The phosphate ester was cooled to 25° and discharged.

The product is a yellow very viscous liquid. The analytical procedure as in Example 1 showed the product to be 65 percent monoester, 23 percent diester, 6 percent unreacted 2-hydroxydecyl-1-acrylate and 6 percent free phosphoric acid.

EXAMPLE 5

Example 4 was repeated with the exception that 364 grams of 2-hydroxydecyl-1-acrylate were replaced by 410 grams (1.6 moles) of 2-hydroxy-dodecyl-1-acrylate obtained by the condensation of one mole of 1,2-epoxydodecane, $C_{12}$ a-olefin oxide, with one mole of methacrylic acid.

The product was a yellow very viscous liquid and consists of 68 percent monoester, 21 percent diester, 6 percent unreacted 2-hydroxy-dodecyl-1-acrylate and 5 percent of free phosphoric acid.

The products; i.e., mixed phosphate esters, prepared as above, are readily homopolymerized in solution of acetone by means of 0.5 to 2 percent by weight (based on the weight of the phosphate esters used) of di-tert.-butyl peroxide at a temperature of 120° C. for a period of 12 to 36 hours yielding tough hard fireproof resins. The homopolymerization may be partial; i.e., by heating a solution of the mixed phosphate esters in a polar solvent such as dioxane, acetone, etc., until a viscous solution is obtained, which may be applied as a coating to various surfaces and cured in ultra-violet light or in baking ovens to yield fireproof tough and hard resinous coatings. A viscous liquid partially homopolymerized product may also be obtained by controlling the period of heating, temperature, and the amount of peroxide catalyst employed.

The mixed phosphate esters may also be polymerized in solution of acetone with N-vinyl lactams, such as N-vinyl-2-pyrrolidone, N-vinyl-2-piperidone and N-vinyl-B-caprolactam; vinyl esters, such as vinyl acetate; acrylic acid esters, diallyl phosphate, etc., to yield a new class of polymeric products.

I claim:

1. The method of making a polymerizable composition of matter comprising essentially of a mixture containing from about 55 percent to about 75 percent of phosphate monoester of the formula:

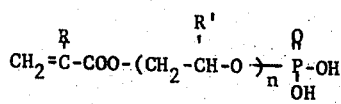

from about 10 percent to about 25 percent of a phosphate diester of the formula:

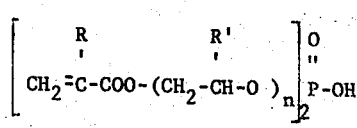

about 3 percent to about 6 percent of unreacted hydroxyalkyl acrylate or methacrylate of the formula:

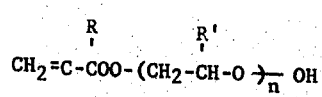

wherein R is selected from the class consisting of hydrogen and methyl, R' is selected from the class consisting of hydrogen and alkyl of from 1 to 22 carbon atoms, and n is a positive integer of from 1 to 3, and from about 4 percent to about 20 percent of free phosphoric acid; which comprises reacting at a temperature of from 40° to 80°C., in the presence of a small amount of polymerization inhibitor, about 1 to 2 moles of a hydroxyalkyl acrylate or methacrylate of the formula given above, with an amount of polyphosphoric acid equivalent to about 1 mole of $P_2O_5$.

2. Polymerizable composition of matter, when made by the method defined in claim 1, comprising essentially of a mixture containing from about 55 percent to about 75 percent of phosphate monoester of the formula:

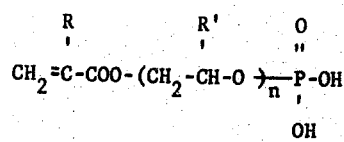

from about 10 percent to about 25 percent of a phosphate diester of the formula:

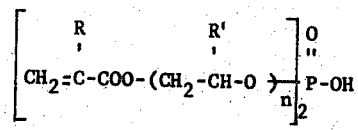

about 3 percent to about 6 percent of unreacted hydroxyalkyl acrylate or methacrylate of the formula:

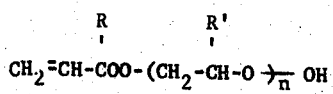

wherein R is selected from the class consisting of hydrogen and methyl, R' is selected from the class consisting of hydrogen and alkyl of from 1 to 22 carbon atoms, and n is a positive integer of from 1 to 3; and from about 4 percent to about 20 percent of free phosphoric acid.

3. Polymerizable composition of matter, when made by the method defined in claim 1, comprising essentially of a mixture containing 66 percent of the phosphate monoester having the formula:

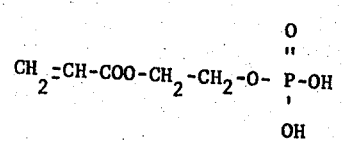

18 percent of the phosphate diester having the formula:

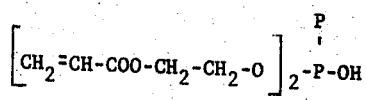

3 percent of unreacted hydroxyethyl acrylate, and 13 percent of free phosphoric acid.

4. Polymerizable composition of matter, when made by the process defined in claim 1, comprising essentially of a mixture containing 60 percent of the phosphate monoester having the formula:

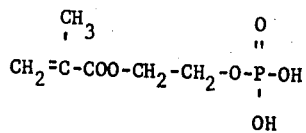

19 percent of the phosphate diester having the formula:

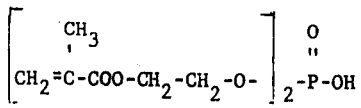

4 percent of unreacted hydroxyethyl methacrylate, and 17 percent of free phosphoric acid.

5. Polymerizable composition of matter, when made by the method defined in claim 1, comprising essentially of a mixture containing 70% of the phosphate monoester having the formula:

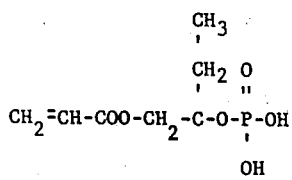

19 percent of the phosphate diester having the formula:

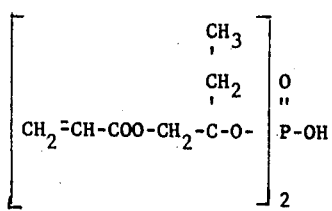

3 percent of unreacted hydroxybutyl acrylate, and 8 percent of free phosphoric acid.

6. Polymerizable composition of matter, when made by the method defined in claim 1, comprising essentially of a mixture containing 65% of the phosphate monoester having the formula:

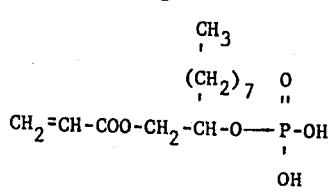

23 percent of the phosphate diester having the formula:

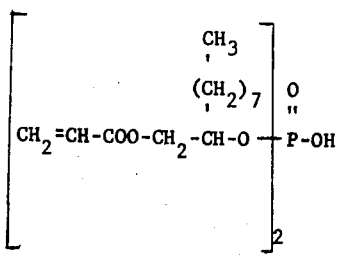

6 percent of unreacted 2-hydroxydecyl-1-acrylate, and 6 percent of free phosphoric acid.

7. Polymerizable composition of matter, when made by the method defined in claim 1, comprising essentially of a mixture containing 68 percent of the phosphate monoester having the formula:

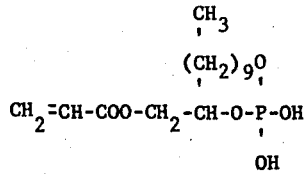

21 percent of the phosphate diester having the formula:

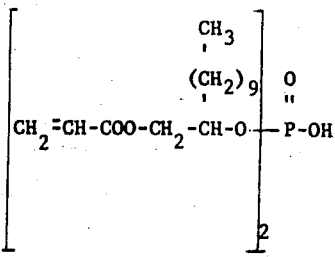

6 percent of unreacted 2-hydroxy-dodecyl-1-acrylate, and 5 percent of free phosphoric acid.

* * * * *